United States Patent Office

2,706,156
Patented Apr. 12, 1955

2,706,156

METHOD OF MAKING SHEET MATERIAL

Hanns F. Arledter, Lee, Mass., assignor to Hurlbut Paper Company, South Lee, Mass., a corporation of Massachusetts No Drawing. Application February 19, 1952, Serial No. 272,519

1 Claim. (Cl. 92—21)

My invention relates to the art of making sheet materials and more particularly to the manufacture of a specialty sheet material having physical characteristics and properties which are not obtainable with the ordinary organic fibers such as are used in the papermaking industry.

By this invention, a sheet material may be prepared in which desired characteristics, depending upon the intended use thereof may be imparted thereto by a simple and inexpensive method.

In the usual papermaking process, cellulosic fibers i. e. fibers derived from various plant materials and consisting essentially of cellulose, are deposited from suspension in water so as to produce an interfelted web. A considerable amount of adhesion or bonding between the individual fibers in contact with each other develops upon the drying of this web.

One of the principal objects of my invention is to provide a strong paper-like material consisting of 100% of glass or silica or any other inorganic fiber material. The sheet material embodying my invention is of paper-like character, the fibers thereof having a heterogeneous or random distribution. That is to say, the fibers are without major orientation or are oriented in a way obtainable with a paper or sheet forming machine.

Inorganic fibers in general, and glass fibers in particular, are characterized by smoothness, brittleness, inability to hydrate when beaten in water, and a lack of tendency to cling to one another when such a mixture is spread upon a continuously moving screen.

Although glass fibers have been woven heretofore so as to form cloth-like materials, it has not been possible up to now to prepare a sufficient strong sheet-like material containing a very high percentage of glass fibers which are arranged heterogeneously as in the case of ordinary paper made of organic fiber material.

I have determined that effective results may be obtained by the combination of inorganic fibers with organic fibers if and when the organic fibers are destroyed during the process of manufacture and at least before the end product is obtained.

More specifically, by means of my investigation, I know that I may combine inorganic fibers such as glass or silica fibers having specific predetermined softening or melting points with suitable organic materials, for instance resins, plastics, rubber, etc., so as to obtain the desired end product by means of the method of my invention.

I have determined that effective results may be obtained by the combination of inorganic glass or silica fibers or other inorganic fibers having a specific melting or softening point with inorganic materials, for instance silicates, hydroxyds, ceramic materials, etc. having specific melting or softening points which are less than the specific melting points of the inorganic fibers.

With such physical characteristics inherent in my combination, I have found it possible by means of a heat treatment hereinafter to be described to destroy and remove all of the organic materials in the sheet material after the formation thereof whereby the end product does not contain any organic materials save for the plain, inorganic glass or silica fiber and inorganic material of which the sheet-like material is made.

That is to say, by means of my method, a strong glass sheet-like material comprising inorganic fiber material is provided which is free of a binder of organic nature in the final or end product. Thus, in the final state, the sheet-like material may contain only the plain inorganic fiber of which the sheet material is basically comprised during its formation.

The process of my invention permits the production of a strong glass or silica fiber material which has special applications in the higher temperature ranges between 600° F. and 2400° F., and more particularly in electrical fields where organic materials normally required in the sheet material for strengthening purposes and the like would prove objectionable. Likewise, the material of my invention is especially suited for filter purposes.

That is to say, my glass or silica material has wide applications for electrical purposes such as are found in the manufacture of electrolyte condensers and the like and for filtering purposes where liquid or air filtering mediums are employed.

Material of this kind can stand temperatures up to 1400° F., or even over 1800° F. when silica fibers are employed.

Plain 100% glass fiber paper has had one inherent drawback, which, up to the time of my invention, has not been solved. The characteristics of such finished paper have depended more or less upon the physical characteristics of the original fibers. One inherent objection of such a paper has been its low strength in the dry state and especially in water or liquids, when it dissolves readily.

That is to say, individual glass fibers have been matted together heretofore but until now they have been bonded together on their crossing points or otherwise. This failure to bond has presented many difficulties in the manufacturing, handling and further processing of the paper, and has precluded its use in a great many applications.

The present invention provides the manufacture of 100% glass fiber sheet material which combines increased high physical strength practically without loss in efficiency, penetration of air resistance for air filter purposes, and provides means to attain this strength even after exposure up to 1200–1300° F. or more. This paper can be treated with resin solutions in the conventional way; it can be used submersed in liquids or for liquid filtering.

Many attempts have been made in the past to prepare glass fiber paper or synthetic fiber paper from mixtures of natural fibers with varying length or beating degree. It has been found in most cases of glass fiber paper, however, that it does not possess a sufficient bonding strength to cause the synthetic fibers to entangle or bond together so as to give the resultant sheet sufficient strength or especially wet strength.

Although my invention is not to be limited by theoretical considerations, I believe that the improved properties of the sheet materials produced by my invention may, in part, be explained by the fact that the compounds which I use to cause the glass fibers to adhere together in more intimate bond than has heretofore been found possible.

As a result of my experimentation, I know that glass fibers having a diameter of for instance, 0.09–3.0 micron and of suitable linear extension for papermaking when associated with a latex emulsion or resin solution under suitable conditions can be fabricated into a coherent paper-like sheet material. The latex emulsion or resin functions as the bonding agent for the glass fibers during the sheet formation stage.

Glass fibers of suitably small diameter so as to insure flexibility and preferably consisting of boro-silicate, silicate or Al-silicate having a low alkali content, are employed for the purposes of my invention.

The new invention allows the manufacture of a stronger glass fiber paper with less expensive glass fibers with bigger diameters than has been possible up to now and allows the employment of all fiber thicknesses and mixtures between thicker and thinner glass fibers in the range between 0.09–5 micron or above or below these figures.

The invention yields a stronger paper for the weight range between for instance 15–40 g./m.² and a thickness between for instance, 1–4 mil.

I have found that glass fiber paper of the kind described can be obtained in the following way: A glass fiber paper strengthened with the help of 2–20% or more or less of suitable organic materials for instance, rubber, urea or melamine resins, etc., is manufactured on a normal paper machine and led through an oven heated with a temperature between, for instance, 1000–2000° F., depending upon the particular nature and melting point of the glass fiber employed. This heat treatment destroys immediately all organic materials and leaves a glass fiber paper with exceptionally good properties. A direct fiber bond between the individual glass fibers is obtained yielding a paper with good mechanical dry strength, sufficient wet strength in water and solvents, and which can be put to many uses where 100% glass fiber paper made heretofore could not be employed.

A glass fiber paper according to the invention made of boron glass fibers with an average thickness of 0.7 micron has, for instance, a dry tensile strength of 1.5–2.0 lbs./in. and a high wet strength of for instance, over 400 g./in. compared with the tensile strength of only 0.2–0.5 lbs./in. for a 100% glass fiber of the same kind which paper has also no wet strength at all and does dissolve very readily in water. (Wet strength 0 g./in.)

In manufacturing an inorganic fiber paper of the kind described, the following principles can be employed: The temperature necessary to strengthen the paper and to destroy and evaporate at the same time all removable organic material from the paper depends upon the fiber material used and the products added to obtain a strong paper in the first instance.

In burning the organic material, the temperature obtained within the sheet and between the fibers to bond the same, depends on the chemical composition.

The second point influencing the strength is, of course, the melting or softening point of the fibers used.

Normal boron glass fiber paper with a melting point between 1400–1500° F. is treated, for instance, with a temperature up to 1350° F. or more or less. Temperature, paper speed and oven area have to be adjusted in a way to obtain the highest strength in the most economical way.

In my laboratory experiments a temperature of 1100–1400° F. and a heat treating time of 5–30 sec. gave good results.

In using silica fibers with a melting point above 1800° F. the treating temperature could be raised to 1700° F. or more with good results. The heating time is materially reduced in this case to destroy the organic matter.

For Al-silicate fibers with a melting temperature over 2400° F., the heat treatment could be exercised with a temperature up to 2400° F. or more or less.

It is understood, therefore, that the heat treatment has to be adjusted according to the requirements in regard to strength, economy, and has to be kept within a range where no other physical properties of the paper requested for the end use are impaired.

It has been found further that a very good strong inorganic fiber paper is obtainable if mixtures between fibers or inorganic materials like ceramic pigments and the like, of low melting point and fibers of higher melting point are employed. The fibers with the higher melting point shall be, in this case, preferably in the excess and the fiber thickness of the fibers with a lower melting point shall be preferably smaller than the fibers with the higher melting point.

In using this method the heat treatment temperature shall approach or be higher than the melting point of the lower melting point fiber, pigment or inorganic material components. The fusing of the fibers is achieved, in this case, with the help of the theoretically molten or softening fibers or inorganic materials which are uniformly distributed throughout the fiber mat.

A paper made of, for instance, 10–40% glass fibers with a thickness of 0.7, 0.2 and 0.009 micron with a melting point of approximately 1450° F. and 70–90% silicate fibers with a melting point above 1800° F. gave good strength if treated with a temperature between 1400 and 1600° F.

By way of illustration, but not by way of limiting my invention, there are given the following specific examples:

*Example I*

100 pounds of boron glass fibers with an average thickness of 0.7 micron and with a melting point of 1450° F. are distributed uniformly in 10,000 pounds of water.

To this mixture, 10 to 20 pounds of latex emulsion with a solid content of approximately 35% is added as a binder.

The stock is beaten in the conventional way and the latex is flocculated with the aid of alum, melamine resin, or urea resin.

The pH of the latex-resin-glass fiber combination is adjusted to around 4.7–6.4.

The beating time is governed by the consistency, beater roll, pressure and speed of the machine, volume of stock, wanted fiber length.

This pulp mixture of glass and latex emulsion may be continuously fabricated into sheet form on a paper making machine, the wet pulp being deposited upon a screen as a layer in the well-known manner whereby the glass fibers are arranged in heterogeneous relation without major orientation.

The paper having been formed upon the conventional pick-up roll, it is then led between a pair of spaced apart hot plates which are heated up to approximately 1340° F. The paper moves at such a speed that it remains subject to the influence of the heat radiation for at least 15 sec. and for no more than 30 sec. during which interval I have found that the organic material is burned off. That is to say, the resultant paper product is completely freed of all unwanted organic material by means of the heat treatment.

I have found that paper so produced has a tensile strength of 1.7 pounds per inch for a weight of 62 g./m.$^2$ and a specific gravity of 0.24. That is to say, I have determined that by means of my method of heat treatment not only do I remove all the objectionable and unwanted organic materials but in the process I bond together the original inorganic fibers.

I have also determined that the wet strength is such that the sheet material can be impregnated easily with water or water solvents.

*Example II*

80 pounds of silica glass fibers, using fibers with an average diameter between 0.5–2.5 micron and having a melting point of approximately 1800° F. are mixed with 20 pounds of boron glass fibers having an average diameter between 0.2 and 0.7 micron and a melting point of approximately 1450° F. are processed in a beater in the conventional manner.

This fiber stock is formed to a fiber mat on the paper machine and the strengthening of the finished paper is achieved with the addition of approximately 8% of a suitable melamine or urea type resin.

The formed paper sheet is led with a speed of, for instance, 6 to 30 feet per minute through an oven heated to a temperature of 1450° F. or higher.

Preferably, during the heat treatment, the paper is run through rolls which are so adjusted that a gentle pressure is exerted upon the paper. For instance, a paper of 10 mil thickness in the finished state may run through rolls which are 6–8 mils apart.

It is to be appreciated that the heat treatment destroys at once and completely all organic materials and leaves as an end product a glass fiber paper with exceptionally good properties.

Having thus described my invention and the best manner of practicing the new process for forming this novel composition without limiting myself to the order of steps of such process recited, or to the proportions of parts employed therein, or to the precise ingredients named therein, as it is evident that each of these ingredients has a considerable range of equivalents, and as it is also evident that the order and proportions of the process may be carried without departing from its scope and purposes, what it is desired to claim and secure by Letters Patent of the United States is:

That method of producing a waterlaid web of sheet material wholly comprising inorganic fibers wherein a binder is added to the furnish and subsequently coagulated on the individual fibers comprising the furnish, the organic binder being chosen from the group consisting of urea resin and melamine resin, fabricating a coherent paper-like sheet material on a sheet forming machine, and heating the sheet to a temperature less than the melting point of the inorganic fibers sufficiently to induce a complete deterioration of the organic binder and a binding together of the inorganic fibers leaving an end product of a paper-like material consisting of 100% of inorganic fiber material.

References Cited in the file of this patent

UNITED STATES PATENTS

| | | |
|---|---|---|
| 1,606,595 | O'Brien | Nov. 9, 1926 |
| 1,646,605 | Wescott | Oct. 25, 1927 |
| 1,829,585 | Dreyfus | Oct. 27, 1931 |
| 2,066,399 | Greider et al. | Jan. 5, 1937 |
| 2,184,316 | Plummer | Dec. 26, 1939 |
| 2,327,991 | Betts | Aug. 31, 1943 |
| 2,446,119 | White | July 27, 1948 |

OTHER REFERENCES

Current Topics, June 1946, page 457.